July 6, 1937.    L. R. NELSON ET AL    2,086,281
SPRINKLER
Filed Sept. 9, 1933    3 Sheets-Sheet 2

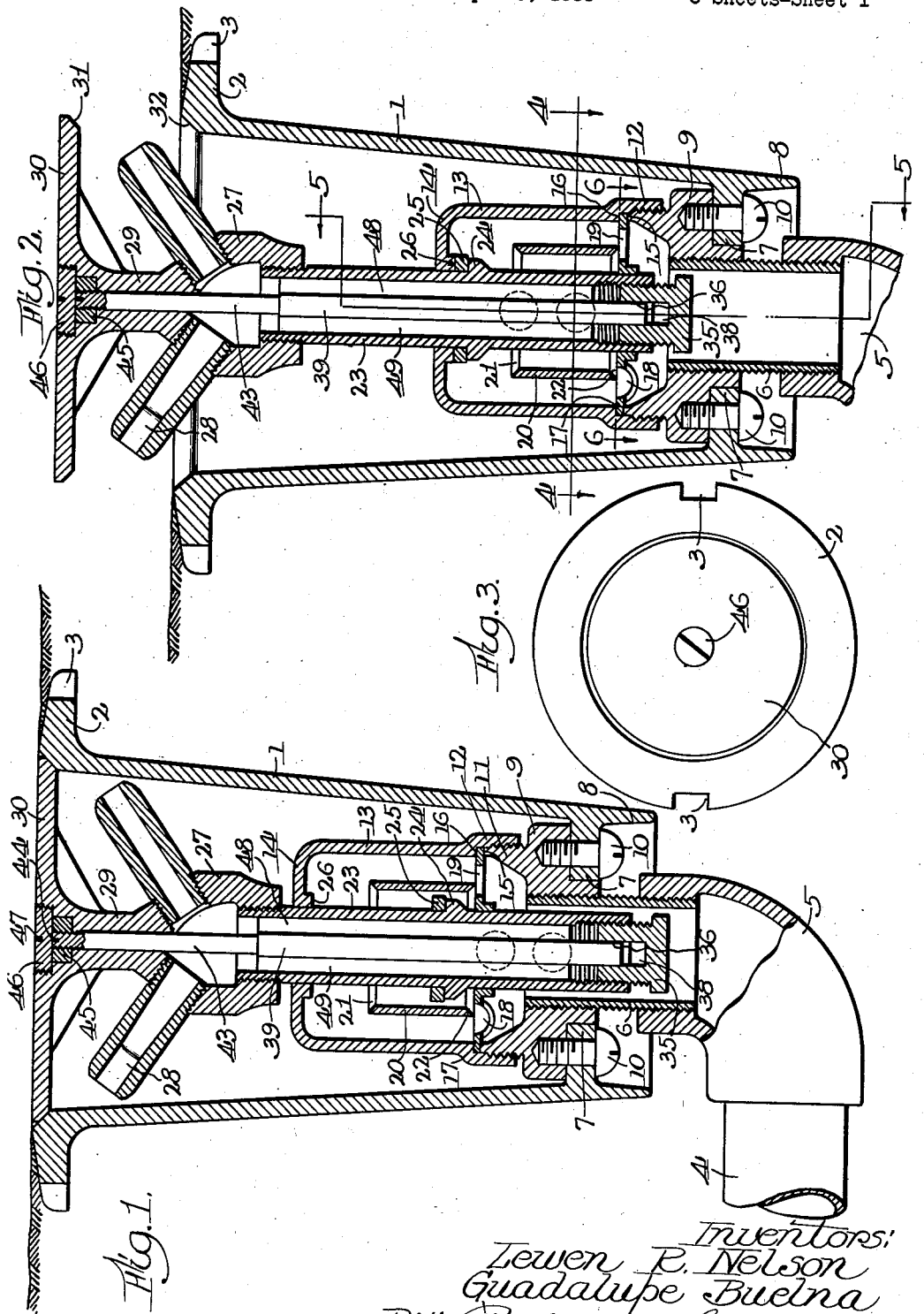

Inventors:
Lewen R. Nelson
Guadalupe Buelna
By: Parkinson & Lane, Attys.

July 6, 1937.  L. R. NELSON ET AL  2,086,281
SPRINKLER
Filed Sept. 9, 1933  3 Sheets-Sheet 3
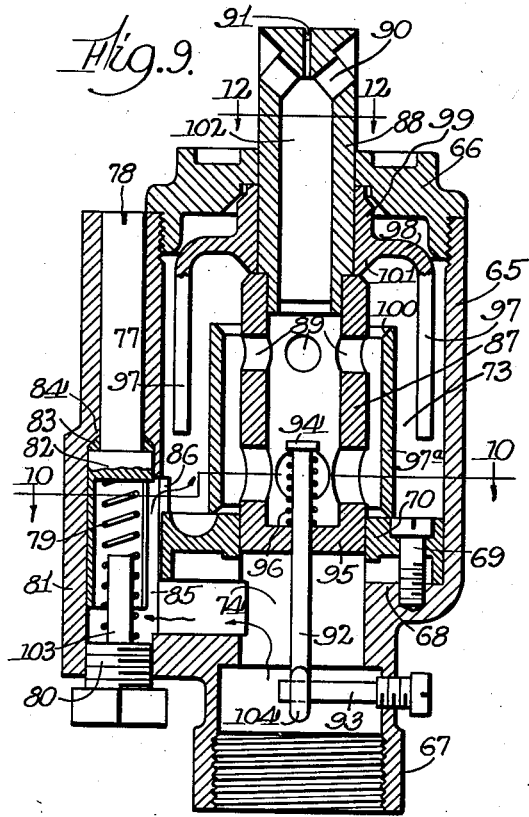
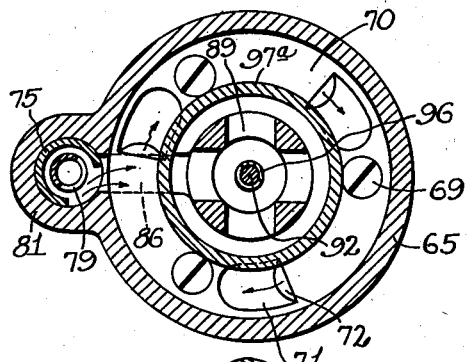
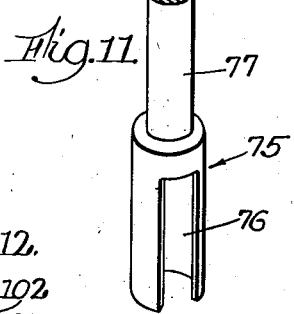
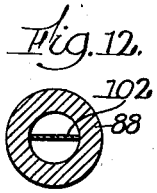
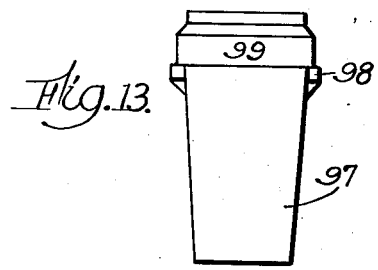
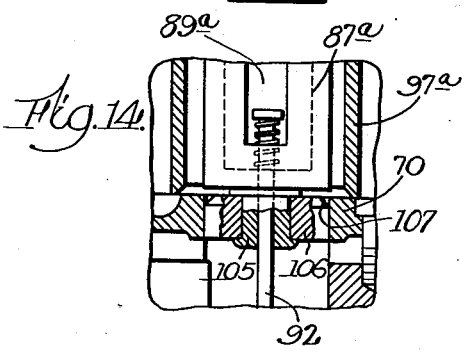
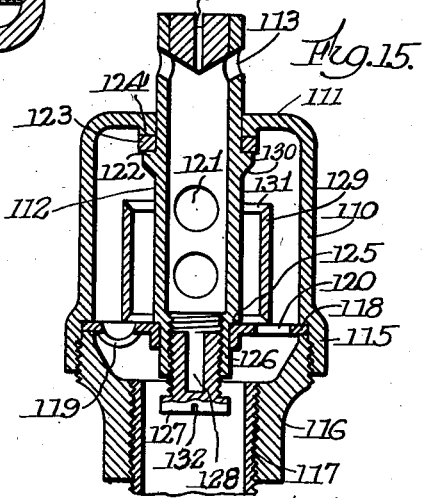
Inventors:
Lewen R. Nelson
Guadalupe Buelna
By: Parkinson + Lane, Atty.

Patented July 6, 1937

2,086,281

UNITED STATES PATENT OFFICE 2,086,281

SPRINKLER

Lewen R. Nelson, Peoria, Ill., and Guadalupe Buelna, Santa Barbara, Calif., assignors to L. R. Nelson Mfg. Co., Inc., Peoria, Ill., a corporation of Illinois Application September 9, 1933, Serial No. 688,774

12 Claims. (Cl. 299—64)

The present invention relates to sprinklers such as those used for sprinkling greens, lawns and the like, but the invention is not limited thereto.

Among the objects of the invention is to provide a novel sprinkler comprising a casing set in the ground with its upper end about level with the surface of the ground and an extensible or "pop-up" spraying device having a part secured to the casing and with or without a closure means, such as a plate for closing the upper end of the casing when the spraying device is in retracted position or condition.

Another object of the invention is to provide a novel sprinkler which may be lifted from its position in the ground as a whole or unit to afford access to any of its parts when it is desired or necessary to do so, and to facilitate this the casing may be tapered. The liquid supply pipe or duct is preferably connected to the lower end of the device.

Another object of the invention is to provide a novel sprinkler irrespective of whether it be extensible or non-extensible, having means for adjustably producing a slow rotation of the spraying part, such as the nozzle or nozzles, by the action of the liquid in the sprinkler, the adjustment or regulation being effected by means so associated with the rotating producing means as to adjustably affect the action of the liquid thereon. The rotation producing means is preferably a freely movable member or body acted upon by the liquid or water in a chamber of the sprinkler so that it will so engage the rotatable means as to cause it to slowly rotate. This action may be varied by by-passing some of the water moving to act on that member or body, as by an adjustable valve connected to the rotating member through which some of the water may pass directly to the nozzles, or in a side passage of the chamber for diverting some of the water from the rotation producing means.

A further object is to provide a novel device of the character mentioned with means for reducing the friction between the relatively movable parts, particularly in cases of large sprinklers.

Other objects, capabilities, advantages and features are comprehended by the invention as will later appear and as are inherently possessed thereby.

Referring to the drawings;

Fig. 1 is a vertical sectional view through a sprinkler constructed in accordance with the invention;

Fig. 2 is a similar view of the same with the spraying part in extended condition;

Fig. 3 is a top plan view of the device shown in Figs. 1 and 2;

Fig. 9 is a vertical sectional view of an alternate form of sprinkler showing an alternate form of adjusting or by-pass means for varying the action of the water on the rotation producing means;

Fig. 10 is a horizontal sectional view taken in a plane represented by line 10—10 in Fig. 9 of the drawings;

Fig. 11 is a perspective view of a detail of the adjusting or by-pass means;

Fig. 12 is a horizontal sectional view taken in a plane represented by line 12—12 in Fig. 9 of the drawings;

Fig. 13 is an elevational view of part of the rotation producing means;

Fig. 14 is a fragmentary part sectional and part elevational view of an alternate form of device; and, Fig. 15 is a vertical sectional view of a further alternate form.

Figure 4:
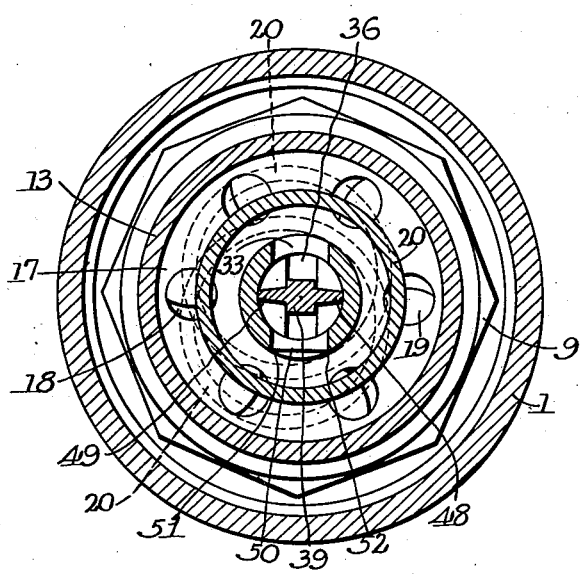
Fig. 4 is a horizontal sectional view taken in a plane represented by line 4—4 in Fig. 2 of the drawings.
Figure 5:
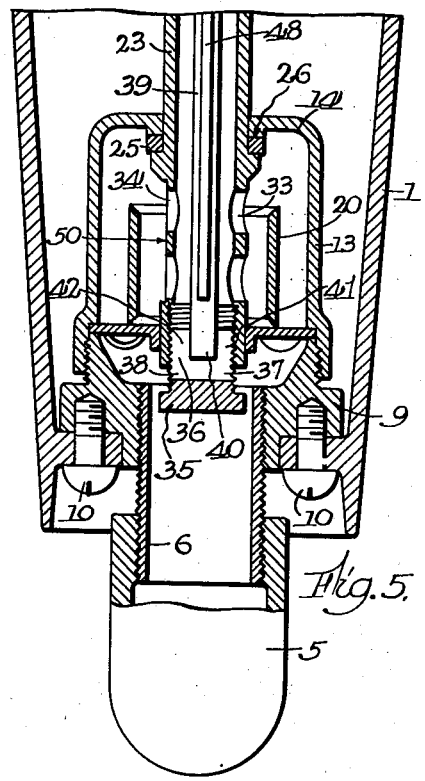
Fig. 5 is a fragmentary sectional view taken in planes represented by line 5—5 in Fig. 2 of the drawings.
Figure 6:
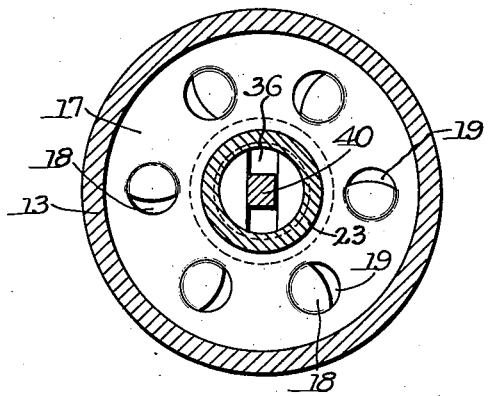
Fig. 6 is a horizontal sectional view taken in a plane represented by line 6—6 in Fig. 2 of the drawings.

Referring more in detail to the drawings, and first more particularly to Figs. 1 to 6 inclusive, the embodiment selected to illustrate the invention is shown as comprising a casing 1 which may be tapered as shown, and set in the earth with its open upper end even with or about on the same level as the surface of the ground, as shown in Figs. 1 and 2. Its upper end has a flange 2 provided with wrench notches 3 for turning the casing and the parts carried thereby when screwing or unscrewing it to or from the water supply pipe or duct 4, the latter having an elbow 5 and a threaded nipple 6 screwed into the elbow and to which the casing 1 is threadedly engaged. The lower end of the casing 1 has an opening through which the nipple 6 extends and surrounding this opening the casing has an inwardly extending flange 7 at a suitable distance above the lower end portion 8 of the casing, the part 8 serving as a skirt or the like for guarding against entry of earth or the like into the elbow 5 should the nipple 6 unscrew therefrom when the casing is removed and lifted from its recess in the ground.

Within the casing 1 is located a spraying device which may be of the extensible or "pop-up" type. It comprises a plate 9 secured to the flange 7 by means of any suitable securing elements, such as screws 10 passing through suitable apertures provided in the flange 7 and threaded into the plate 9. This plate has a central opening suitably threaded to engage the upper end of the nipple 6, as clearly shown in Figs. 1 and 2, and has integrally formed therewith an annular extension 11 suitably threaded to receive the threaded flanged portion 12 of a chamber 13 having a dome 14 provided with a central opening for the sliding therethrough of the movable part of the spraying device. The extension 11 has an annular seat 15 and the chamber 13 has an annular shoulder 16 between which is clamped a plate 17 having a central aperture for the sliding therethrough of the movable part of the spraying device. The plate 17 is provided with a number of pressed-out parts to form scoops 18 and openings 19 so arranged that as the water passes through the openings 19 and against the scoops 18, the water is projected upwardly and tangentially to produce a whirl in the chamber 13. On the plate 17 normally reposes a ring 20 whose upper and lower ends may be provided with bevels 21 and 22 respectively for a purpose later disclosed. The whirl of water acts upon and against this ring to make it swing or roll around in the chamber 13 and about the movable part of the spraying device, as also raising and tipping the ring so that it will hit or contact with and so engage with the movable part of the spraying device as to cause a slow rotation of it.

The spraying device comprises a tube 23 which is slidable through the openings of the plate 17 and the dome 14. It has a collar 24 carrying a packing or sealing ring 25 adapted to seat against the hub 26 of the dome 14 when the tube is in raised position, as shown in Fig. 2. To the upper end of the tube 23 is secured, as by screw threads, a head 27 carrying any suitable number of nozzles 28 upwardly directed or inclined for projecting streams of water over the ground when the device is raised, as in Fig. 2. The head 27 has a post 29 the upper end of which is formed into a plate 30 of such a size as to close the upper open end of the casing 1, both the plate and the casing having suitable seating bevels 31 and 32 to form a substantial sealing contact therebetween when the device is in retracted condition as shown in Fig. 1.

The lower portion of the tube 23 has one or more openings 33 and 34 for affording communication between the chamber 13 and the passage in the tube. See Fig. 5. The water passes from the chamber 13 through these openings 33 and 34 into the tube 23 and thence to the nozzles 28. The lower end of the tube is threaded to adjustably receive a valve plug 35 having a cross slot 36 which when the plug is more or less unscrewed provides entry ports 37 and 38 for the passing of water from the chamber portion beneath the plate 17 to and into the tube 23, thus by-passing some of the water otherwise passing through the plate 17 into the chamber 13 above the plate 17, and into the tube 23 by way of the openings or ports 33 and 34.

This valve 35 may be adjusted from the exterior of the device by way of an adjusting stem 39 extending through the tube 23 and the upper part of the device. This stem comprises at its lower end a square portion 40 fitting in the middle of the slot 36 so as to provide ample passages 41 and 42 in the slot 36 at both sides of the part 40. At the upper end the stem has a round portion 43 rotatable in the post 29 and having at its end a screw slot 44. Its upper end is also threaded for the securement of a thrust collar 45. Above this is a closure disc 46 threaded into the plate 30 and having a screw slot 47. To adjust, the disc 46 is unscrewed and removed. Then a screw driver is inserted in the slot 44 and the stem turned the desired degree to cause the plug 35 to move up or down to decrease or increase the size of the ports 37 and 38 and accordingly vary the amount of water by-passed into the tube 23.

Because of the swirling of the water in the chamber 13, there is also a tendency of the water swirling in the tube 23 and sputtering at the nozzle outlets thus affecting the distance the streams are thrown. To avoid this condition, the tube contains a baffle for causing the water to pass in a more or less straight path to the nozzles. The baffle may be constructed by providing elongated wings or fins 48 and 49 at each side of the stem 39 so as to provide two vertical channels in the tube 23 for the passage of the water to the nozzles. The fins may be tapered as shown in Fig. 4 to cover as little as possible the ports 33 and 34 when the edges of the fins happen to be located opposite them. Any number of fins may be used as desired, the invention not being limited to the particular number of fins shown in the drawings.

That portion of the tube 23 which is located in chamber 13 when the tube is in raised position (see Figs. 2 and 5), is preferably provided with a flattened or like part or face 50 so as to provide between such face and the curved surface of the tube, edges or the like 51 against which the ring 20 may contact or hit when it is moved about by the swirling water in the chamber 13.

In operation the parts are, when not sprinkling water, in the position shown in Fig. 1, the casing being set in the ground and connected to the water duct. To effect sprinkling, the water is turned on at any suitable point in the pipe line. As the water passes, under pressure, through the elbow 5 and the nipple 6 to flow through the holes 33 and 34 and tube 23 to the nozzles, with some water passing through the ports 37 and 38, the water acts against the head of the valve plug 35 to force the tube 23 and connected parts, upwardly, and to maintain such parts in raised or extended position so long as the water is on.

As the tube 23 rises, the plate 30 is lifted from its seat, as shown in Fig. 2, so that the jets of water may be projected from the nozzles through the clearance provided between the plate 30 and the top of the casing 1. The sealing ring 25 seats against the hub 26 and being preferably of material having little friction, rotation of the tube 23 is facilitated. At the same time, the ported part of the tube 23, moves into the chamber 13 so as to receive water from said chamber through the ports 33 and 34. The water flows through the openings 19 in the plate 17 and against the scoops 18 to be thrown upwardly into a whirl in the chamber 13. This causes a movement of the ring 20 around the ported part of the tube 23 so that the ring hits against the edge 51 or the face 50 near such edge to give the tube an increment of movement in the direction of rotation of the whirl. If the rotating of the whirl be in an opposite direction then the action of the ring is against the edge 52 and the face part adjacent it. Also, the frictional contact or engagement between the ring and the tube will assist in giving the tube a rotation in the same direction. The force of the water projected into the chamber 13 is sufficient to lift the ring 20 and to cause it to cant or tip whereby the bevel 21 may hit the edge 51 or frictionally engage the tapered part of the collar 24, thus further contributing to the rotative effect of the tube 23. The bevel 22 may likewise hit the edge of the port 33 or 34, and since the circumference of ring 20 is greater than that of tube 23, the bevel 21 of ring 20 engages the edge of port 33 or 34, when striking across the center of port, exerting a dragging force against the edge of the port, as it does in striking the edge of flattened face 50. In this way the nozzles are slowly rotated and the streams projected thereby are cast the maximum distance over the ground for the force of the water passing through the device.

If the full force of the water be desired to produce such rotation of the spraying device, the valve 36 at the lower end of the tube 23 may be entirely closed so that no water may by-pass by way of the ports 37 and 38, but where it is desired to make the rotation slower, the valve 36 may be opened so as to allow some of the water to by-pass through the ports 37 and 38 and thus reduce the force of the water acting on the ring 20 and its rotative effect on the tube 23.

When the water is shut off, the spraying device descends by its own weight to the retracted position shown in Fig. 1, the plate 30 closing the upper end of the casing 1.

Should access be desired to the parts of the spraying device, the casing and connected parts may be disconnected from the water supply duct, by means of a suitable wrench applied in the notches 3 and by turning the whole unit to unscrew it from the nipple 6 or, if the latter be tight with the plate 9, to unscrew it with the nipple from the elbow 5. The skirted part 8 will guard against any of the earth falling into the elbow as the unit is lifted from its recess in the ground.

Figure 7:
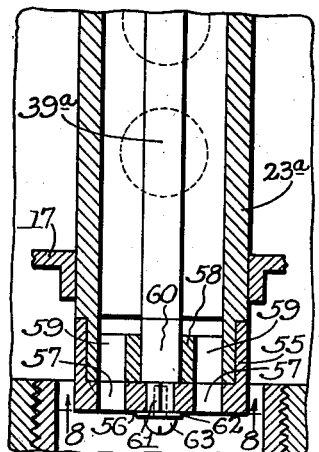
Fig. 7 is a fragmentary vertical sectional view of an alternate form of adjusting or by-passing means for varying the action of the water in the rotation producing means.
Figure 8:
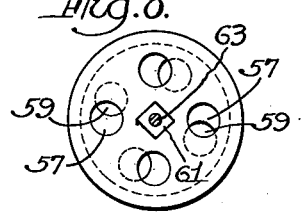
Fig. 8 is a sectional view taken in a plane represented by line 8—8 in Fig. 7 of the drawings.

Figs. 7 and 8 are for the purpose of showing a different form of valve at the lower end of the tube 23. In these figures the lower end of the tube 23a (corresponding to tube 23 in Figs. 1 to 6 inclusive) is so reduced in diameter to rotatably receive the flange 55 of a cap type of valve having a valve disc 56 provided with valve ports 57. In the lower end of the tube 23a is either integrally formed or fixed a disc 58 having valve ports 59 adapted to register with the ports 57. The lower end of the stem 39a (corresponding to stem 39 in Figs. 1 to 6 inclusive) has a bearing part 60 rotatable in a central bearing of the disc 58, and a square part 61 fitting into a square opening in the valve plate 56. The latter is held secured to the part 61 by way of a washer 62 and a screw 63 threaded into the end of the part 61. Adjustment is made by turning the stem 39a, as in the case of turning the stem 39 in Figs. 1 to 6 inclusive, so as to cause the plate 56 to rotate relative to the disc 58 to bring the ports 57 and 59 more or less into or out of registry and thus vary the amount of water to be by-passed into the tube 23a. In other respects, the structure is the same as described above in connection with Figs. 1 to 6 inclusive.

In Figs. 9, 10, 11, 12, and 13 is shown another form of device embodying the same principles of invention. It comprises a chamber 65 closed at its upper end by a cap 66, and having a threaded lower end part 67 for connection to a water supply duct. This chamber has a shoulder 68 upon which seats and to which are secured, as by screws 69, a plate 70 having scoops 71 and openings 72 for causing a whirl of the water passing into the chamber 65 through the openings 72. The plate 70 divides the chamber into compartments 73 and 74. At one side is provided a by-pass valve comprising a valve 75 having a port 76 adapted to communicate with both compartments 73 and 74 and having a stem 77 provided with a screw slot 78 accessible from the exterior of the device. The valve is held in place by a spring 79 reacting between a plug 80 screwed in the lower end of the valve chamber 81 and a part 82 of the valve, the latter having a shoulder carrying a packing or sealing ring 83 in sealing contact with a shoulder 84 of the valve casing. The latter has an inlet port 85 in communication with the compartment 74 and also a port 86 in communication with the compartment 73.

Both the cap 66 and the plate 70 have central apertures for the sliding therein of a tube 87 and a nozzle 88, the tube portion 87 having ports 89 for establishing communication between the compartment 73 and the interior of the tube 87. The nozzle 88 is secured in any suitable manner to the upper end of the tube 87 and has upwardly and inclined orifices 90 and 91 for the spraying of the water in inclined and upward streams as desired. The lower end of the tube 87 is closed except for an aperture in which is slidably fitted a stem 92 connected to a pin 93 screwed into the side of the connection 67. This stem has a head 94 between which and the bottom 95 of the tube reacts a spring 96 normally tending to move the tube and nozzle into retracted position, the tube and nozzle being shown in Fig. 9 in extended position.

In the compartment 73 and surrounding the ported part of the tube 87, is a ring 97a which is adapted to move about and contact not only the tube 87 but also the legs 97 of a cross member 98 rotatably mounted on the nozzle 88 above the upper end of the tube 87 as shown in Fig. 9, the member 98 having a hub 99 adapted to have rotary thrust engagement with the cap 66 as shown.

When the water is shut off, the tube 87 and nozzle 88 are in retracted position with the top of the nozzle about even with the top of the plate 66 and the lower end 95 of the tube 87 resting on the pin 93 by reason of the expansible action of the spring 96. When the water is turned on, it acts against the end 95 of the tube to lift it and the nozzle into the extended or projected position shown in Fig. 9. The water passes through the plate 70 and sets up a whirl in the compartment 73 thus causing a movement of the ring 97a which rolls about the ported part of the tube 87 and hits against the legs 97 of the member 98. Since the latter is in sufficient frictional engagement with the nozzle 88 and the tube 87, the member 99 imparts an incremental rotative movement of the nozzle and tube so that the streams projected from the orifices 90 and 91 will be cast around slowly over the ground at a maximum distance for the force of the water acting in and through the device. The frictional engagement of the ring 97a with the ported part of the tube 87 will also assist in causing the tube and nozzle to rotate. The pressure of the water will maintain the nozzle and tube in raised or extended condition.

For the full force of the water to act through the plate 70 and against the ring 97a, the valve 75 may be closed, but when it is desired to slow down the rotation of the streams projected from the nozzle orifices, a part of the water may be by-passed through the valve 75 from the compartment 74 to the compartment 73. This may be variably effected from the exterior of the device by the application of a screw driver to the slot 78 and turning the stem 77 and the valve sleeve 75 so as to bring the slot 76 more or less into registry with the ports 85 and 86 as desired in accordance with the amount of water to be by-passed and the amount of slowing down of the rotation of the nozzle desired. By-passing some of the water reduces the amount of water passing through the disc or plate 70 and the whirling action thereof on the ring 97a. The force of the water in the compartment 73 is such as to lift the ring and to cause its upper beveled end 100 to frictionally engage with the tapered shoulder 101 in assistance of the rotative action of the member 98 and the nozzle 88 and the tube 87. The plug 80 may have a stem 103 for maintaining the spring 79 from buckling.

When the water is shut off, the spring 96 acts to lower the tube 87 with the nozzle 88 and the rotation producing member 98 with its legs 97. In some cases, this spring is not necessary, and the part may return to retracted position by gravity alone.

For the purpose of reducing the whirling action of the water in the nozzle 88, the nozzle 88 is provided with a baffle plate 102 which acts to cause the water to pass in the tube in a more or less straight direction free from the whirling action set up in the chamber. The lower end of the stem 92 is in the form of an eye 104 for receiving the pin 93.

In large devices, it is advantageous to reduce the friction between the relatively rotative parts. A means for this purpose is shown in Fig. 14 wherein the lower end of the tube 87a (corresponding to tube 87 of Figs. 9 and 10) is provided with a pivot 105 having a rotative bearing in a disc 106 adapted to fit into the central aperture of the plate 70 so that the area of frictional surface between the pivot 105 and the disc 106 is much less than the area of the frictional surface between the disc 106 and the plate 70. This avoids the large amount of friction that would be present in case the tube itself were to slide through the opening in the plate. The stem 92 passes through the pivot 105 as shown. When the tube rises through the central aperture of the plate 70, the disc 106 which has a bevel 107, self centers itself in the aperture of the plate 70 as is clearly shown from Figure 14. In other respects, the device is the same as described above in connection with Figs. 9, 10, 11, and 12. Tube 87a has an elongated port 89a.

If desired, the tube 87 may be provided with a flattened face and edges for the contact and impacting of the ring 97 as in the case of the form shown in Figs. 1 to 6 inclusive.

In Fig. 15 is shown a form of device which may be either of the "pop-up" or "stand-up" type of sprinkler, which comprises a chamber 110 having a dome 111 with a central aperture through which extends or slides a tube 112 having nozzle orifices 113 and 114 for the projection of the water in inclined and upward streams. The lower end of the chamber 115 is threaded to a fitting 116 in turn threadedly engaged with a nipple 117 connected to the water supply duct. See Figs. 1, 2, and 5. Between the chamber 110 and fitting 116 is clamped a plate 118 having scoops 119 and openings 120 for causing the whirling of the water in chamber 110 after passing through the plate 118 as in the case of the devices shown in Figs. 1, 2, 4, 5, 6, 9, and 10. The tube has ports 121 for communication between the chamber 110 and the interior of the tube 112, and also has a collar 122 carrying a sealing ring 123 in sealing contact with the hub 124 of the dome 111. The lower end of the tube 112 may have a shoulder 125 seated on the plate 118, and has a threaded extension 126 in which is adjustably engaged a valve plug 127 having a cross slot 128 providing ports for the entry of water from the space beneath the plate 118 into the tube 112. Above the plate 118 is located a ring 129 adapted by the action of the whirling water in chamber 110 to contact and frictionally engage the tube 112 as also the tapered part 130 by way of the bevel 131 to produce a slow rotation of the tube 112 and the nozzle. When the plug 127 is closed, the full force of the water acts through the plate 118 against the ring 129 to effect a contact or impact or frictional engagement with the tube 112 to rotate it. When it is desired to slow down the rotation, some of the water may be by-passed from the space below the plate 118 into the tube 112 by opening the valve plug 127. Adjustment may be made by applying a screw driver to the slot 132 in the plug 127 and turning the plug 127 to open more or less of the slot 128 to the interior of the tube 112. This reduces the amount of the water passing through the plate 118 and against the ring 129. The ring 129 may act as above described in connection with the devices shown in Figs. 1 to 6 inclusive and Figs. 9, 10, 11, and 12. To have access to the plug 127, it is necessary that the device be unscrewed from the nipple 117.

The invention is not limited to the particular embodiments described herein and shown upon the drawings, nor to a "pop-up" type of sprinkler, but applies also to a "stand-up" type of sprinkler, and to other constructions, details, arrangements of parts and features as may come within the scope and spirit of the invention.

Having thus disclosed the invention, we claim:

1. A sprinkler comprising a chamber connected to a liquid supply duct, a spraying device rotatably associated with said chamber and having a tubular part extending into said chamber and provided with an opening for communication between said chamber and said part, said part having a non-circular portion to provide an edge portion between the non-circular and the circular portions of said tubular part, a freely movable member in said chamber encircling said part and so arranged to engage said edge portion by the action of the liquid in said chamber to produce a striking or dragging effect against said part and secure a slow rotation of said spraying device.

2. A sprinkler comprising a chamber connected to a liquid supply duct, a spraying device rotatably associated with said chamber and having a tubular part extending into said chamber and provided with an opening for communication between said chamber and said part, said part having a flattened portion, a freely movable member in said chamber and so arranged to engage said flattened portion by the action of the liquid in said chamber to produce a slow rotation of said spraying device, and means so associated with said part as to vary the action of the liquid on said freely movable member.

3. A sprinkler comprising a chamber connected to a liquid supply duct, a spraying device rotatably associated with said chamber and having a tubular part extending into said chamber and provided with an opening for communication between said chamber and said part, said part having a flattened portion, a freely movable member in said chamber and so arranged to engage said flattened portion by the action of the liquid in said chamber to produce a slow rotation of said spraying device, means so associated with said part as to vary the action of the liquid on said freely movable member, and means for adjusting said varying means.

4. A sprinkler comprising a chamber connected to a liquid supply duct, a spraying device rotatably associated with said chamber and having a tubular part extending into said chamber and provided with an opening for communication between said chamber and said part, said part having a flattened portion, a freely movable member in said chamber and so arranged to engage said flattened portion by the action of the liquid in said chamber to produce a slow rotation of said spraying device, and a valve for varying the action of the liquid on said freely movable member.

5. A sprinkler comprising a chamber connected to a liquid supply duct, a spraying device rotatably associated with said chamber and having a tubular part extending into said chamber and provided with an opening for communication between said chamber and said part, said part having a flattened portion, a freely movable member in said chamber and so arranged to engage said flattened portion by the action of the liquid in said chamber to produce a slow rotation of said spraying device, a valve for varying the action of the liquid on said freely movable member, and means for adjusting said valve.

6. A sprinkler comprising a chamber connected to a liquid supply duct, a spraying device rotatably associated with said chamber and having a part extending into said chamber and provided with an opening for communication between said chamber and said part, said part having a flattened portion, a freely movable member in said chamber and so arranged to engage said flattened portion by the action of the liquid in said chamber to produce a slow rotation of said spraying device, a valve for varying the action of the liquid on said freely movable member, and means connected to said valve and accessible exteriorly of said sprinkler for adjusting said valve.

7. A sprinkler comprising a chamber connected to a liquid supply duct, a spraying device rotatably associated with said chamber and having a tubular part extending through said chamber and with an opening communicating directly with said supply duct, said part having a non-circular portion, said device having an opening communicating with said chamber for reception of the liquid from said chamber, means in said chamber and so arranged with respect to said spraying device and said chamber as to produce a slow rotation of said spraying device by the action of the liquid passing to said chamber, and means for varying the amount of the liquid passing through said chamber.

8. A sprinkler comprising a chamber connected to a liquid supply duct, a spraying device rotatably associated with said chamber and having a tubular member extending into said chamber and provided with an opening for communication between said chamber and said member, said member having a non-circular portion, a freely movable member in said chamber encircling said first member and so arranged to engage said non-circular portion by the action of the liquid in said chamber to produce a striking or dragging effect against said first member and secure a slow rotation of said spraying device.

9. A sprinkler comprising a chamber connected to a liquid supply duct, a spraying device rotatably associated with said chamber and having a tubular part extending into said chamber and provided with an opening for communication between said chamber and said part, said part having a flattened portion, a freely movable member in said chamber and so arranged to engage said flattened portion by the action of the liquid in said chamber to produce a slow rotation of said spraying device, and means so associated with said parts as to vary the action of the liquid on said freely movable member, said tubular part being movable vertically by the force of the liquid.

10. A sprinkler comprising a chamber connected to a liquid supply duct, a spraying device rotatably associated with said chamber, and having a tubular part extending into said chamber, and provided with an opening for communication between said chamber and said part, said part having a non-circular portion, a freely movable member in said chamber and so constructed as to be moved by the action of the liquid in a circuitous path around said part, and adapted to engage said non-circular portion to produce a striking effect on said part and secure a slow rotation of said spraying device.

11. A sprinkler comprising a chamber connected to a liquid supply duct, a spraying device rotatably associated with said chamber and having a tubular part extending into said chamber and provided with an opening for communication between said chamber and said part, said part having a non-circular portion, a freely movable member in said chamber and so arranged to engage said non-circular portion by the action of the liquid in said chamber to produce a slow rotation of said spraying device, and means so associated with said part as to vary the action of the liquid on said freely movable member.

12. A sprinkler comprising a chamber connected to a liquid supply duct, a spraying device rotatably associated with said chamber and having a tubular part extending into said chamber and provided with an opening for communication between said chamber and said part, said part having a non-circular portion, a freely movable member in said chamber and so arranged to engage said non-circular portion by the action of the liquid in said chamber to produce a slow rotation of said spraying device, means so associated with said part as to vary the action of the liquid on said freely movable member, and means for adjusting said varying means.

LEWEN R. NELSON.
GUADALUPE BUELNA.